(12) United States Patent
Spitzer

(10) Patent No.: US 8,323,019 B2
(45) Date of Patent: Dec. 4, 2012

(54) BLOW MOULD APPARATUS WITH CONTROLLED LOCKING MECHANISM

(75) Inventor: Thomas Spitzer, Wiesent (DE)

(73) Assignee: Krones AG (DE)

( * ) Notice: Subject to any disclaimer, the term of this patent is extended or adjusted under 35 U.S.C. 154(b) by 28 days.

(21) Appl. No.: 13/073,649

(22) Filed: Mar. 28, 2011

(65) Prior Publication Data

US 2011/0236525 A1 Sep. 29, 2011

(30) Foreign Application Priority Data

Mar. 26, 2010 (DE) .......................... 10 2010 013 185

(51) Int. Cl.
*B29C 49/56* (2006.01)
(52) U.S. Cl. ..................................... 425/541; 425/451.4
(58) Field of Classification Search .................. 425/541, 425/451.4
See application file for complete search history.

(56) References Cited

U.S. PATENT DOCUMENTS

| | | | |
|---|---|---|---|
| 5,064,366 A * | 11/1991 | Voss | 425/541 |
| 5,346,386 A * | 9/1994 | Albrecht et al. | 425/541 |
| 6,918,754 B2 * | 7/2005 | Albrecht | 425/541 |
| 7,103,464 B2 | 9/2006 | Zielke | 701/70 |
| 7,341,443 B2 * | 3/2008 | Lemaistre et al. | 425/541 |
| 7,377,766 B2 | 5/2008 | Lemaistre et al. | 425/541 |
| 7,384,261 B2 | 6/2008 | Mie et al. | 425/540 |
| 2011/0280984 A1 * | 11/2011 | Hoellriegl et al. | 425/541 |

FOREIGN PATENT DOCUMENTS

| | | |
|---|---|---|
| DE | 10 318 596 | 4/2003 |
| DE | 20 2008 016 838 | 4/2009 |
| DE | 10 2008 063 939 | 7/2010 |
| EP | 1 276 589 | 1/2003 |
| EP | 1 276 598 | 1/2003 |
| WO | WO 01/66301 | 9/2001 |
| WO | WO 01/81060 | 11/2001 |
| WO | WO 2010/069808 | 6/2010 |

OTHER PUBLICATIONS

European Search Report dated Apr. 8, 2011 (4 pgs).

* cited by examiner

*Primary Examiner* — James Mackey
(74) *Attorney, Agent, or Firm* — Haynes Soloway P.C.

(57) ABSTRACT

A blow mould apparatus for moulding plastic preforms into plastic containers with a first mould carrier element and a second mould carrier element which is swivelable about a connecting axis in relation to the first mould carrier element, wherein the mould carrier elements cooperate such that in a closed state of the blow mould apparatus they form in their interior a cavity in which the plastic preforms can be expanded into plastic containers, and with a locking device which locks the first mould carrier element in relation to the second mould carrier element in order to hold the blow mould apparatus at least temporarily in a closed state, wherein the locking device has at least one locking element which is arranged on a mould carrier element, is mobile and cooperates with the other mould carrier element to lock the mould carrier elements and wherein the locking device comprises a mobile actuation element, the movement of which is coupled at least temporarily with a movement of the locking element, the actuation element and/or locking element being mobile between at least two prespecified positions.

12 Claims, 5 Drawing Sheets

Figure 1:
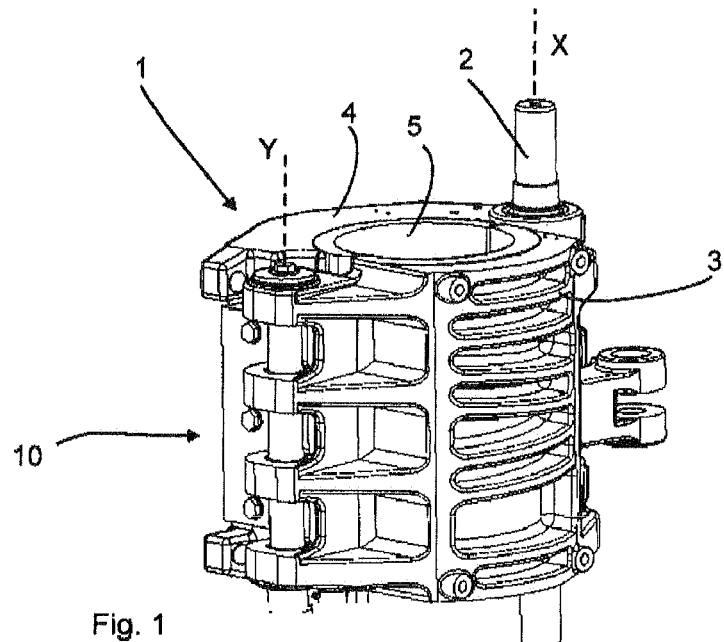

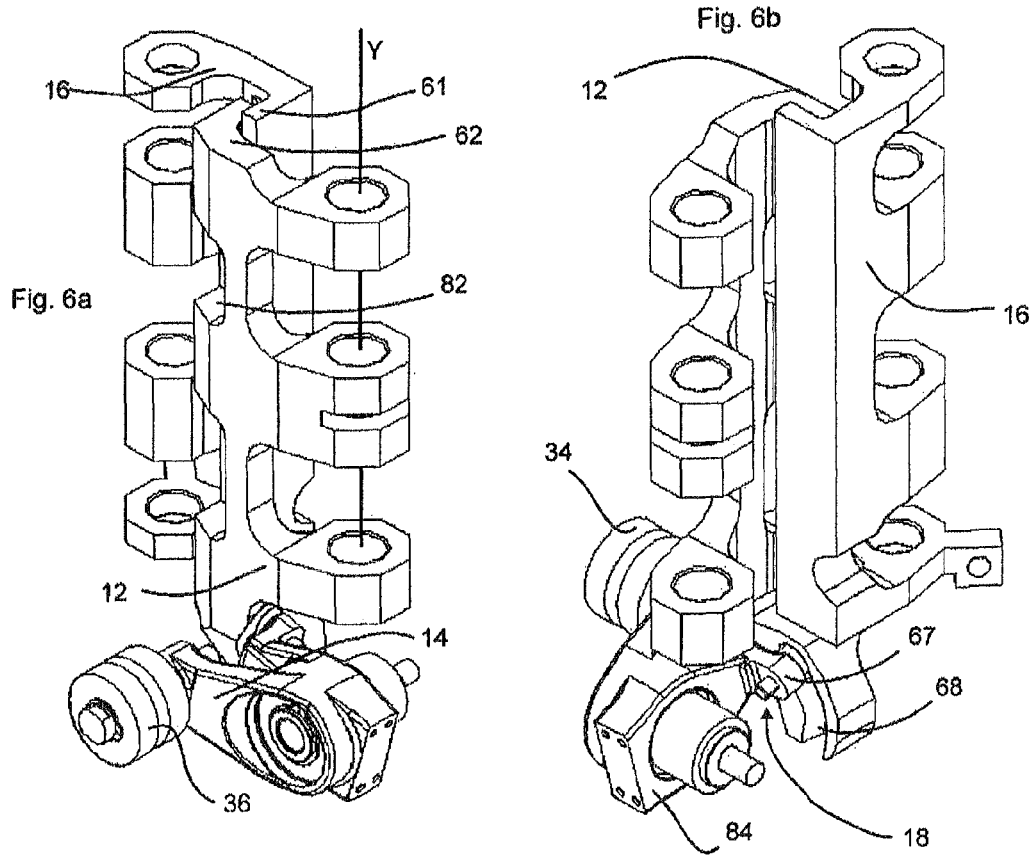
Fig. 6a
Fig. 6b
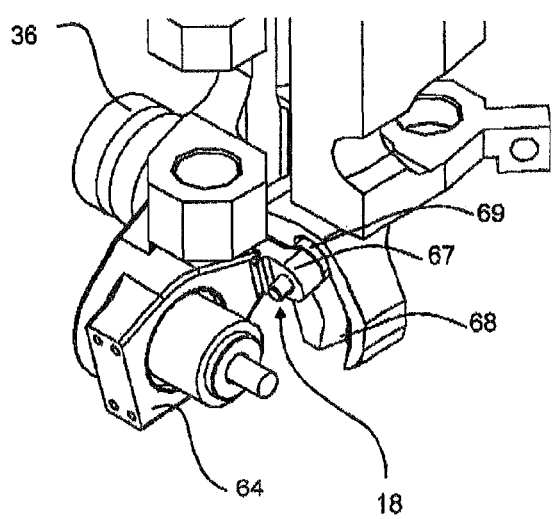
Fig. 6c
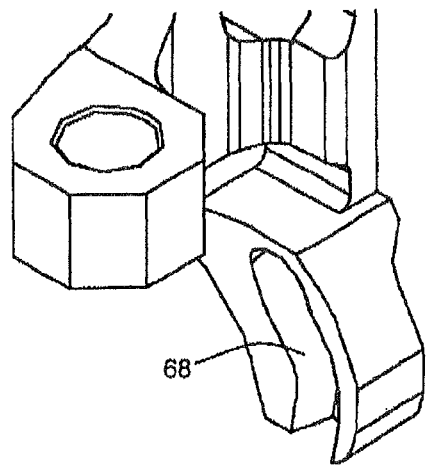
Fig. 6d

BLOW MOULD APPARATUS WITH CONTROLLED LOCKING MECHANISM

The present invention relates to a device for forming plastic preforms into plastic containers. These devices have been known from the prior art for some time. Usually such devices have a multiplicity of blowing stations, in the interior of which is arranged a blow mould, wherein the plastic preforms are expanded against an inner wall of this blow mould, in particular by pressurisation with compressed air. The blow moulds are usually arranged on blow mould carriers, wherein these blow mould carriers can be swung apart to open the blow mould.

During the actual expansion process, these mould halves are locked together so that they cannot open during the actual forming process.

These locking mechanisms in the prior art are partly controlled by guide curves which in particular are arranged stationary and on which move curve rollers, so that by the design of the guide curves the blow moulds can be locked or unlocked at pre-specified times.

U.S. Pat. No. 7,377,766 B2 discloses a blow moulding device for production of plastic containers. This device has a locking mechanism wherein two locking means are provided which are arranged on the two blow mould halves. Each of these locking elements has a multiplicity of hook-like fingers which can each engage in the second element.

DE 103 18 596 A1 describes a method on a device for blow moulding of containers. A blow mould comprising two blow mould segments is provided with a locking element to perform the locking, wherein this locking is transverse to the separating plane of the blow mould segments. The locking element can be swivelled in the horizontal direction.

The above-mentioned guide curves work satisfactorily. However occasionally the problem arises that the locking was not achieved completely, which leads to uncertainties in a working process. The same applies to the unlocking, which is required for removal of the plastic container.

The present invention is based on the object of improving the locking and unlocking process for such blow mould apparatus. Preferably simple and low cost means are used to achieve this.

A blow mould apparatus according to the invention for moulding plastic preforms into plastic containers has a first mould carrier element and a second mould carrier element which is swivelable about a connecting axis in relation to the first mould carrier element. The mould carrier elements cooperate such that in a closed state of the blow mould apparatus, they form a cavity in their interior in which the plastic preforms can be expanded into plastic containers. Furthermore a locking device is provided which locks the first mould carrier element in relation to the second mould carrier element, in order to keep the blow mould apparatus at least temporarily in a closed state.

The locking device has at least one locking element which is arranged on a mould carrier element and is mobile in particular in relation to the mould carrier element, and which cooperates with the second mould carrier element (or a second locking element arranged thereon) to lock the mould carrier elements. The locking device has a moving actuation element, the movement of which is at least temporarily coupled with a movement of the locking element, wherein the actuation element and/or the locking element is mobile between at least two pre-specified positions.

According to the invention the locking device has a guide device arranged in the blow mould apparatus which cooperates with the locking element and/or the actuation element such that the locking element and/or actuation element is forced into one of the two positions.

Temporary coupling of the movements means that movement of the actuation element at least indirectly, preferably directly, leads to a movement of the locking element.

It is therefore proposed according to the invention that a guide or forcing device is provided which forces the locking element and/or actuation element into a particular one of said positions. This guide device is in particular not the stationary guide curve which is in any case provided, but an additional guide device which, in particular depending on the position of the actuation element, forces this into precisely one of the two predefined positions. In this way it can be ensured that the locking device is always in a defined state i.e. completely locked or unlocked. This procedure avoids intermediate positions.

Preferably the guide device achieves that the actuation element is forced into one of the two positions. These two positions of the actuation element however entail, preferably via the coupling, corresponding locking or unlocking positions of the locking element.

Advantageously the two mould carrier elements each hold blow mould halves which in the interior form the cavity mentioned above. In addition a base mould can be provided which closes said cavity at the bottom. In this cavity the plastic preforms are expanded into plastic containers in particular by pressurisation with compressed air. Thus a corresponding blow mould is advantageously held by the two mould carrier elements. In addition the device preferably has a nozzle device in order to pressurise the plastic preforms with a fluid medium, in particular compressed air.

The locking element itself can be formed in various ways. For example it can be a rotatable shaft which extends parallel to said connecting axis of the mould carrier elements and which locks or unlocks the blow mould depending on its rotary position. One example of such a locking element is known from EP 1 276 598 B1. The subject of EP 1 276 589 B1 is included in the subject of the present application by reference.

Thus a locking element can be provided on a mould carrier element which cooperates with another counter element arranged on the other mould carrier element to lock the two mould carrier elements together. As stated this counter element or also the locking element can be moved between a locked position in which the blow mould is locked and an unlocked position in which the blow mould is opened. It can also be mounted rotatably, for example in the locked position resting partly on the locking element and in the unlocked position releasing the locking element.

The actuation element can for example be linked or connected directly to the locking element so that movement of the actuation element is coupled directly to movement of the locking element. It would however also be possible for the actuation element to be swivelable for example about an axis other than that for the locking element, and by corresponding force transfer mechanisms a movement of the actuation element leads to a corresponding movement of the locking element. Advantageously the actuation element is a lever which is preferably swivelable about a prespecified swivel axis.

Advantageously the mould carrier elements are in a locked state in one of the two positions of the actuation element and/or locking element and in an unlocked state in the other of the two positions of the actuation element. Advantageously the two positions are end positions or switch positions which characterise the movement of the actuation element. In a further advantageous embodiment the guide device has a curve device with a curved outer surface, the movement of which is coupled to a movement of the actuation element. By use of this curve device, which for example can be swivelable together with the actuation element, because of the curved outer surface preferred positions of this guide device and hence preferred positions of the coupled actuation element are reached.

Preferably the blow mould apparatus has a further guide curve, in particular arranged stationary, which moves the actuation element (in particular on movement thereof).

Advantageously a position of the curve device can be modified in relation to the actuation element. This modification allows adjustment of the end positions of the actuation element.

In a further advantageous embodiment the curve device has at least two (in particular separable) curve elements, the relative positions of which are preferably modifiable. In this way it is possible to modify the above two positions of the actuation element or locking element (also relative to each other).

In a further advantageous embodiment the guide device has a force application element which contacts the curve device at least temporarily and preferably permanently. By this contact, the guide device or also the two above-mentioned curve elements can be forced into a specific position.

In a further advantageous embodiment the force application element exerts a force on the curve element or curve device which has a component perpendicular to the outer surface of the curve element. By exercise of this force in conjunction with the curved surface of the curve device, the curve element can be forced into a specific position.

Advantageously the curvature of the outer surface of the curve device as a whole has varying radii of curvature and in particular curvatures with opposite sign.

In a further advantageous embodiment the blow mould apparatus has at least one spring element which pretensions the force application element in the direction of the guide device. In this way the guide element and hence also the actuation element can be forced into a predetermined position.

In a further advantageous embodiment the outer surface of the guide element has two spaced recesses with which the force application element can make contact. Here the actuation element is advantageously in a first position when the force application element is arranged in the first recess, and the actuation element is advantageously in the second position when the force application element is in the second recess. In this embodiment, the cooperation of the force application element and the guide device establishes two defined positions, in particular end positions. It is possible that the first recess is formed by the first curve element and the second recess by the second curve element. In this way it is also possible to change the spacing of the two recesses in relation to each other in order to modify the two relative end positions of the actuation element.

In a further advantageous embodiment the force application element is arranged on a swivelable lever. In this way the force application element can be released or withdrawn from the recesses. It is possible that this swivelable lever is arranged on one mould carrier element and in particular on the mould carrier element on which the locking device is provided. Advantageously the position of the force application element is in the position in which it lies constantly on the guide element so that here precisely two end positions of the guide element are permitted.

In a further advantageous embodiment the force application element is rotatable in relation to a pre-specified axis. In this way the force application element can roll in relation to the guide element.

In a further advantageous embodiment the locking device has an actuator which is mobile together with the actuation element and cooperates with the sloping surface of the locking element such that movement of the actuator causes movement of the locking element. Thus for example it is possible for a peg to be arranged on the actuation element which slides in a guide groove itself provided on the locking device. By movement of this peg in relation to the guide groove, a targeted movement of the locking device can also be achieved.

Further advantageous embodiments arise from the enclosed drawings.

Figure 2:
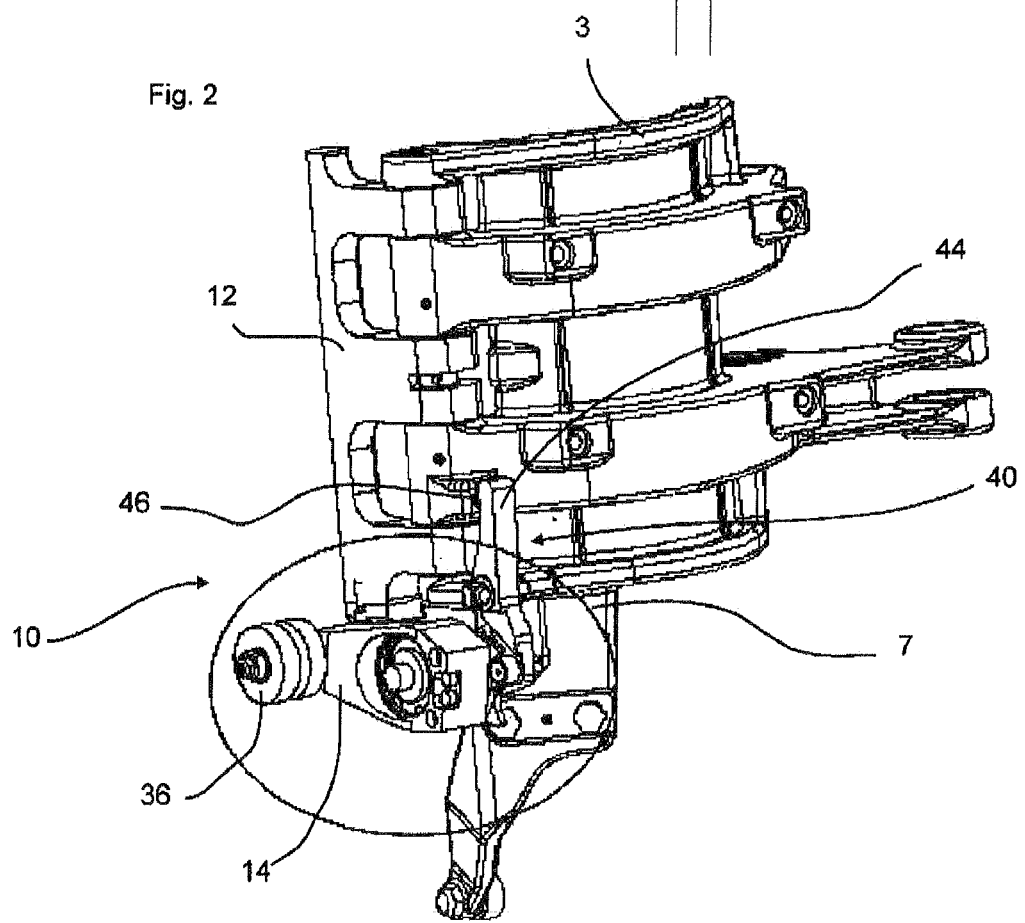
Figure 3:
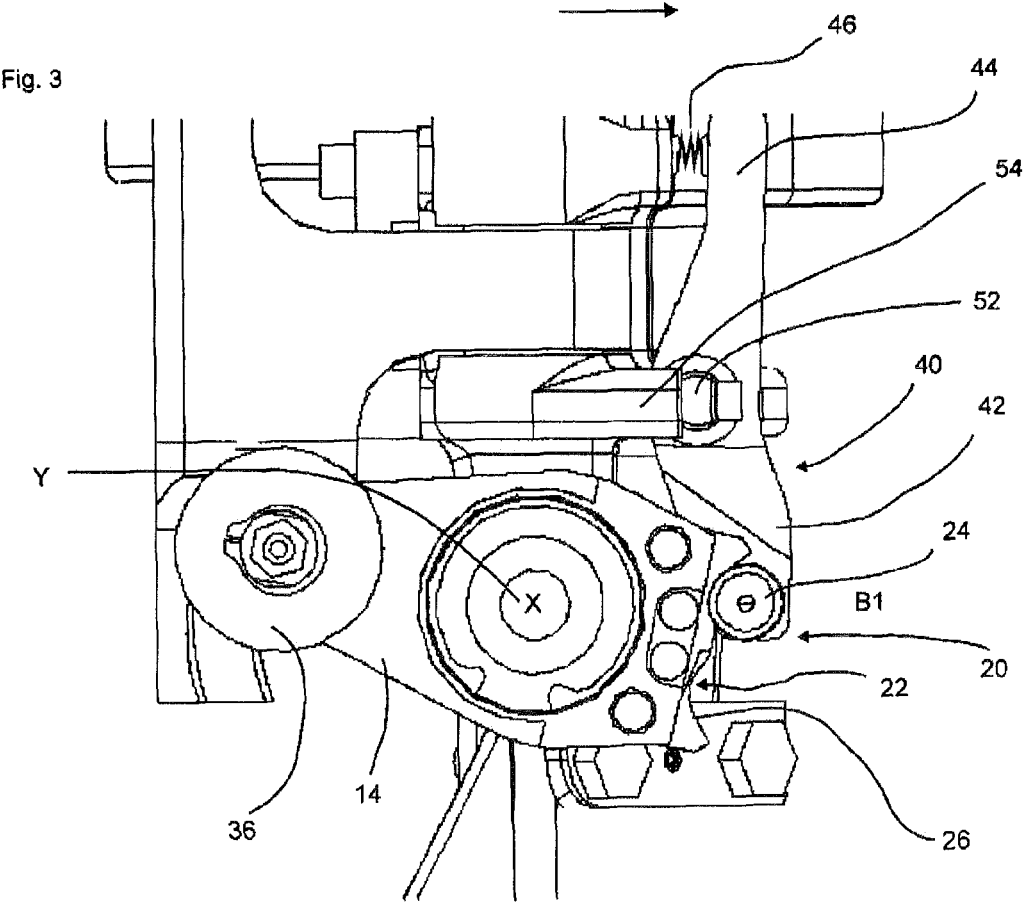
Figure 4:
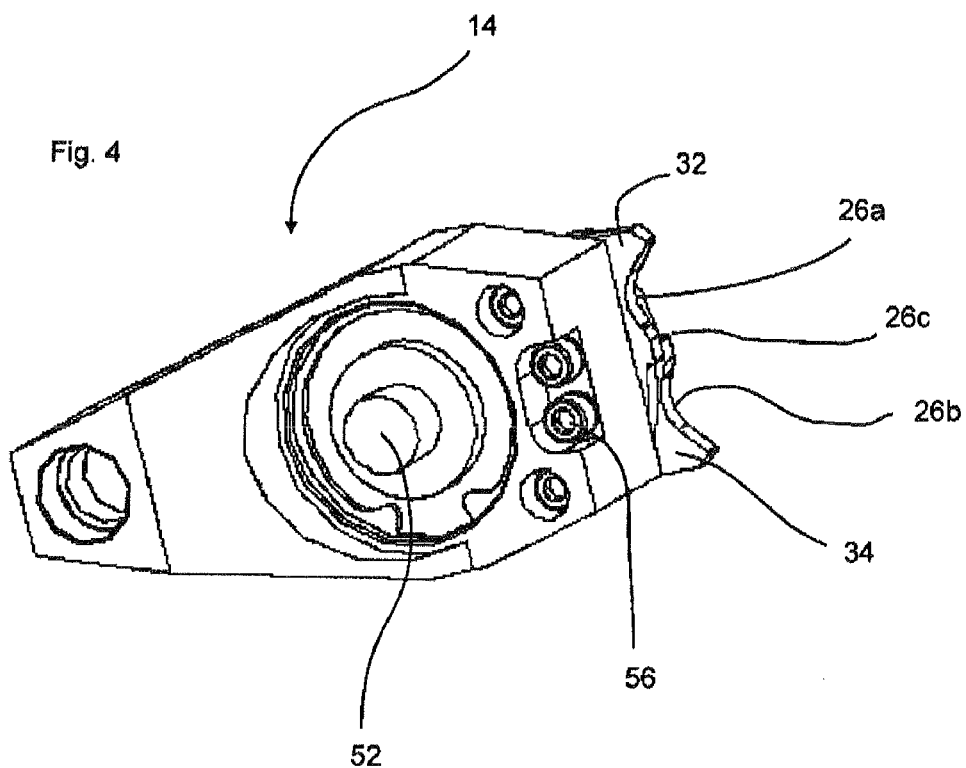
Figure 5:
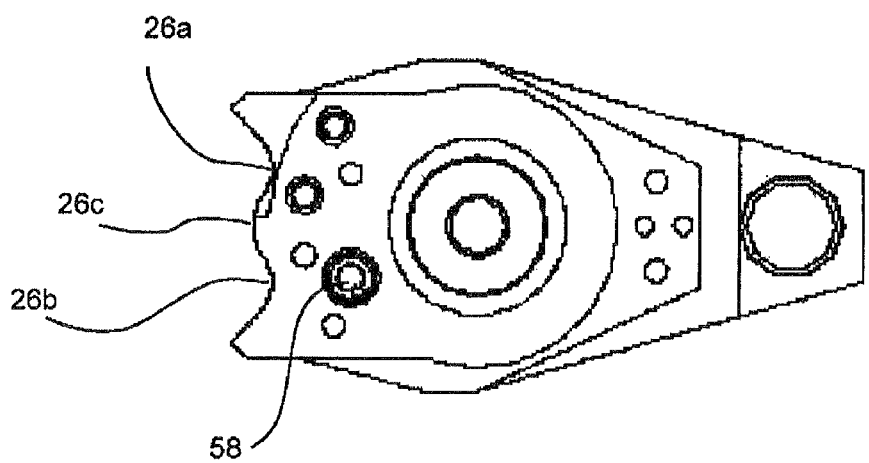

These show:

FIG. 1 a view of a blow mould apparatus;
FIG. 2 a detailed view of a mould carrier;
FIG. 3 a side view of the device in FIG. 2;
FIG. 4 a perspective view of a actuation element;
FIG. 5 a top view from behind onto the actuation element in FIG. 4;
FIG. 6a-6d four views to illustrate the operation of the locking element; and
FIG. 7 a further embodiment of a device according to the invention.

FIG. 1 shows a part view of a blow mould. This blow mould 1 has two mould carrier elements 3, 4 serving as mould carriers rotatable about a connecting axis 2, more precisely a first mould carrier element 3 and a second mould carrier element 4. These two mould carrier elements 3, 4 are designed such that in closed state they form an inner cavity 5, in which by means of mould inserts (not shown) (or a blow mould), a preform (not shown) can be blow-moulded or contoured in a stretch blow moulding process.

To close the two mould carrier elements 3, 4, these are swivelled about the connecting axis 2 such that the two side surfaces meet each other. FIG. 1 shows a closed locked state of the two mould halves 3, 4. Reference numeral 10 relates to a locking device which can be turned to lock the two mould halves 3, 4 together.

FIG. 2 shows a detail view of a blow mould apparatus according to the invention. It is evident that here on the mould carrier element 3 is arranged a actuation element 14 in the form of a swivelable lever. This actuation element can be swivelled about axis Y (see FIG. 3). Reference numeral 7 designates (shown merely in part) a base element which can be raised from below onto the mould carrier element to close a blow mould also at the bottom. Reference numeral 12 relates to a locking element which is arranged to lock with a second locking body 16 on the second mould carrier element 4 (not shown). Reference numeral 10 as a whole indicates the locking device. A curve roller 36 can roll in relation to a stationary guide curve (not shown), whereby the actuation element 14 can be swivelled depending on position of this guide curve. By swivelling this actuation element 14, the locking device 10 can also be activated and the lock released.

Reference numeral 44 relates to a lever arm which is part of lever 40 which in turn is pivoted on the mould carrier element.

FIG. 3 shows a side view of the device shown in FIG. 2. Here again we see the actuation element 14 with curve roller 36. It is evident that a curve device 22 is arranged on the actuation element 14. This curve device has an outer surface 26 which cooperates with a force application element 24. This force application element 24 is designed as a roller which is arranged rotatable on the lever 40 or the lower lever arm 42 of this lever. Due to this rotatability, the force application element 24 can roll in relation to the outer surface 26. Reference numeral 20 designates the guide device as a whole which comprises the curve device 22 and the force application element 24.

Reference numeral 54 relates to a carrier on which the lever 40 is swivelably mounted by means of a shaft 52. An upper lever arm 44 of the lever 40 is forced by means of a springing device 46 in the direction of arrow P so that the force application element arranged on the other arm 42 is pressed onto the curve device 22. In this way the force application element 24 is prestressed in relation to the actuation element 14.

FIG. 4 shows a perspective view of the actuation element 14. It is evident that two curve elements 32 and 34 are arranged above each other along axis Y on the actuation element 14, wherein the curve element 32 forms a first recess 26a and the second curve element 34 forms a second recess 26b. In a central region 26c the two curve elements 32, 34 transform into each other so as to form as few edges or chamfers as possible. This simplifies a transition of the force transfer element from the first recess 26a to the second recess 26b or vice versa.

These two recesses 26a and 26b simultaneously establish the positions in which the force application element shown in FIG. 3 can engage. In this way two positions are established, in particular end positions of actuation element 14 which can be swivelled by means of a shaft 42. In the situation shown in FIG. 3 the actuation element is in position B1. If the force application element 24 is arranged in the lower recess 26b, the actuation element 14 is in position B2 (not shown). Reference numeral 56 relates to screw devices with which the curve elements 32 and 34 are locked rotationally stationary on the actuation element 14. However it is also possible to move the two curve elements 32 and 34 towards each other after releasing the screw device so that the distance between the two recesses 26a and 26b can be modified.

FIG. 5 shows a back of the actuation element 14. Here again can be seen the two recesses 26a and 26b and the intermediate region 26c arranged between the two recesses 26a and 26b. Reference numeral 58 relates to an additional clamping screw with which the position of the two guide elements 32 and 34 can be fixed.

FIGS. 6a-6d show a further embodiment of a mechanism according to the invention. Here again a curve roller 36 or more precisely a double curve roller 36 is provided which runs along a curve track (not shown). On this curve roller 36 is arranged a lever 14 which is set in rotation by movement of the curve roller. Firmly attached to this lever 14 is an engagement element 18 which achieves a swivelling of the locking element 12 about axis Y.

By swivelling the locking element 12 an engagement between hooks 62 and corresponding counter-hooks 61 can be created or separated. In FIG. 6c the engagement mechanism is explained in more detail. The lever 14 as stated is arranged swivelable on a fixed carrier 64. The guide device 20 shown in the previous figures is not shown here.

Also provided on lever 14 is an engagement body or actuator 18, or more precisely a roller 69 which is arranged on a roller carrier 67 and runs in a groove 68 formed on or in the locking element 12. The groove 68 is a three-dimensional groove and movement of the roller 69 in this groove 68 leads to swivelling of the locking element 12 about axis Y. It is evident that the groove 68 has a curved path and the roller 69 can roll in this groove 68 without tilting. Preferably a groove width of groove 68 is slightly larger than the diameter of the roller 69. The roller arranged on its carrier 67 as a whole forms an actuator to move the locking element 12.

The other hook or locking element 16 in the embodiment shown in FIGS. 6a-6d is not swivelable but it would also be possible to swivel the two hooks to open or close the blow mould. In this embodiment a curve 68 is integrated directly in the locking element for opening and closing the blow mould.

The curve for moving the roller 36 is again preferably controlled by a curve fixed in relation to the machine when the blow stations pass by this curve in their cycle. Furthermore it would also be conceivable for a slip coupling to be integrated in the movement path between the roller 36 and the locking element 12 which can react to a locking of the hooks 61 and 62.

Figure 7:
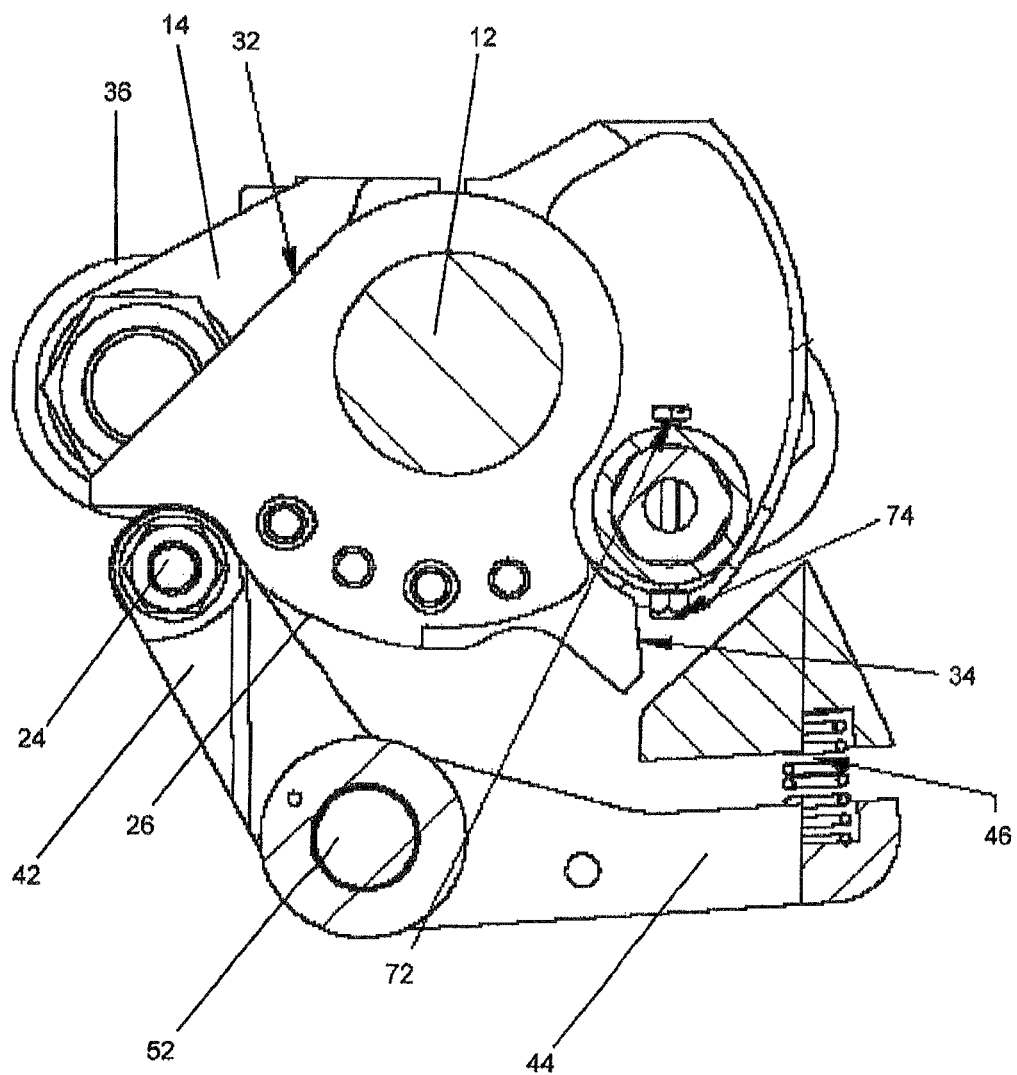

FIG. 7 shows a further embodiment of the present invention. In this design the actuation element 14 with curve roller 36 is pivoted directly to or coupled rotationally stationary with the locking device 12. Also the guide device 22 or the two curve elements 32 and 34 are here arranged directly on the locking device 12. In addition here again the force application element 24 can be seen which is here arranged in one of the two recesses, namely the recess which is formed by the curve element 32. The reference numerals 72 and 74 relate to actuator means or actuator screws with which the position of the two guide elements 32, 34 in relation to the actuation element 14 or the relative positions of the two guide elements 32, 34 can be modified.

The applicant reserves the right to claim all features disclosed in the application documents as essential to the invention where novel individually or in combination in relation to the prior art.

LIST OF REFERENCE NUMERALS

1 Blow mould apparatus
2 Connecting axis
3 First mould half, mould carrier element
4 Second mould half, mould carrier element
5 Cavity
7 Base element
10 Locking device
12 Locking device
14 Actuating element
16 Second locking body
22 Curve device
24 Force transfer element, force application device
26 Outer surface
26a fist recess
26b Second recess
26c Central region
32, 34 Curve element
36 Curve roller
40 Lever
42 Lever arm, shaft
44 Lever arm
46 Spring device
52 Shaft
54 Carrier
56 Screw devices
58 Clamping screw
61 Counter hook
62 Hook
64 Carrier
67 Roller carrier
68 Groove, curve
69 Roller
72, 74 Actuator means
B1 Position
B2 Position
P Arrow
X Connecting axis
Y Axis

The invention claimed is:

1. A blow mould apparatus for moulding plastic preforms into plastic containers with a first mould carrier element and a second mould carrier element which is swivelable about a connecting axis in relation to the first mould carrier element, wherein the mould carrier elements cooperate such that in a closed state of the blow mould apparatus they form in their interior a cavity in which the plastic preforms can be expanded into plastic containers, and with a locking device which locks the first mould carrier element in relation to the second mould carrier element in order to hold the blow mould apparatus at least temporarily in the closed state, wherein the locking device has at least one locking element which is arranged on one of the mould carrier elements and is mobile and cooperates with the other mould carrier element to lock the mould carrier elements and wherein the locking device comprises a mobile actuation element, the movement of which is coupled at least temporarily with a movement of the locking element, the actuation element or locking element being mobile between at least two prespecified positions, wherein the locking device comprises a guide device which is arranged on the blow mould apparatus and cooperates with the locking element or actuation element such that the locking element or actuation element is forced into one of the two positions, wherein the guide device has a curve device with a curved outer surface, the movement of which is coupled with a movement of the actuation element, and wherein the curve device has at least two curve elements, the relative position of which can be modified.

2. The blow mould apparatus according to claim 1, wherein in one of the two positions of the actuation element, the mould carrier elements are in a locked state whereas in the other of the two positions of the actuation element, the mould carrier elements are in an unlocked state.

3. The blow mould apparatus according to claim 1, wherein a position of the curve device can be modified in relation to the actuation element.

4. The blow mould apparatus according to claim 1, wherein the guide device has a force application element which contacts the curve device.

5. The blow mould apparatus according to claim 4, wherein the force application element exerts a force on the curve device the force having a component standing perpendicular to the outer surface of the curve device.

6. The blow mould apparatus according to claim 4, wherein the outer surface has two spaced recesses which can be contacted by the force application element, wherein the actuation element is in a first position when the force application element is arranged in a first recess, and the actuation element is in a second position when the force application element is arranged in a second recess.

7. The blow mould apparatus according to claim 4, wherein the force application element is arranged on a swivelable lever.

8. The blow mould apparatus according to claim 1, wherein the locking device has an actuator device which is mobile together with the actuation element and cooperates with a sloping surface of the locking element such that by movement of the actuator device, a movement of the locking element is achieved.

9. A blow mould apparatus for moulding plastic preforms into plastic containers with a first mould carrier element and a second mould carrier element which is swivelable about a connecting axis in relation to the first mould carrier element, wherein the mould carrier elements cooperate such that in a closed state of the blow mould apparatus they form in their interior a cavity in which the plastic preforms can be expanded into plastic containers, and with a locking device which locks the first mould carrier element in relation to the second mould carrier element in order to hold the blow mould apparatus at least temporarily in the closed state wherein the locking device has at least one locking element which is arranged on one of the carrier elements and is mobile and cooperates with the other mould carrier element to lock the mould carrier elements and wherein the locking device comprises a mobile actuation element the movement of which is coupled at least temporarily with a movement of the locking element, the actuation element or locking element being mobile between at least two prespecified positions, wherein the locking device comprises a guide device which is arranged on the blow mould apparatus and cooperates with the locking element or actuation element such that the locking element or actuation element is forced into one of the two positions, wherein the guide device has a curve device with a curved outer surface, the movement of which is coupled with a movement of the actuation element, wherein the guide device has a force application element which contacts the curve device and wherein the outer surface has two spaced recesses which can be contacted by the force application element, wherein the actuation element is in a first position when the force application element is arranged in a first recess, and the actuation element is in a second position when the force application element is arranged in a second recess.

10. The blow mould apparatus according to claim 9, wherein a position of the curve device can be modified in relation to the actuation element.

11. The blow mould apparatus according to claim 9, wherein the curve device has at least two curve elements, the relative position of which can be modified.

12. The blow mould apparatus according to claim 9, wherein the locking device has an actuator device which is mobile together with the actuation element and cooperates with a sloping surface of the locking element such that by movement of the actuator device, a movement of the locking element is achieved.

* * * * *